(12) United States Patent
Treger

(10) Patent No.: US 12,463,229 B2
(45) Date of Patent: *Nov. 4, 2025

(54) BIPOLAR IONOMER MEMBRANE

(71) Applicant: CAMX Power LLC, Lexington, MA (US)

(72) Inventor: Jack Treger, Quincy, MA (US)

(73) Assignee: CAMX Power LLC, Lexington, MA (US)

( * ) Notice: Subject to any disclaimer, the term of this patent is extended or adjusted under 35 U.S.C. 154(b) by 689 days.

This patent is subject to a terminal disclaimer.

(21) Appl. No.: 17/858,482

(22) Filed: Jul. 6, 2022

(65) Prior Publication Data

US 2022/0352534 A1 Nov. 3, 2022

Related U.S. Application Data

(63) Continuation of application No. 16/072,995, filed as application No. PCT/US2017/016538 on Feb. 3, 2017, now Pat. No. 11,417,904.

(Continued)

(51) Int. Cl.
*H01M 8/1011* (2016.01)
*B01D 67/00* (2006.01)
(Continued)

(52) U.S. Cl.
CPC ........ *H01M 8/103* (2013.01); *B01D 67/0006* (2013.01); *B01D 67/0093* (2013.01); *B01D 69/106* (2022.08); *B01D 69/1071* (2022.08); *B01D 71/82* (2013.01); *C08J 5/2237* (2013.01); *C08J 5/225* (2013.01); *H01M 8/1011* (2013.01); *H01M 8/1062* (2013.01); *H01M 8/1081* (2013.01); *H01M 8/188* (2013.01);
(Continued)

(58) Field of Classification Search
CPC .. H01M 8/103; H01M 8/1011; H01M 8/1062; H01M 8/1081; H01M 8/188; Y02E 60/50
See application file for complete search history.

(56) References Cited

U.S. PATENT DOCUMENTS 5,743,921 A 4/1998 Nazri et al.
2002/0090541 A1 7/2002 Hobson et al.
(Continued)

FOREIGN PATENT DOCUMENTS

JP 2002246041 A 8/2002
JP 2005298564 A 10/2005
(Continued)

OTHER PUBLICATIONS

Minh, N., Science and Technology of Ceramic Fuel Cells, Chapter 8—Electrode Reaction: 199-232, Publisher Summary, 1995.
(Continued)

*Primary Examiner* — Osei K Amponsah
(74) *Attorney, Agent, or Firm* — Weston R. Gould; Dinsmore & Shohl LLP

(57) ABSTRACT

Provided are membranes useful for electrochemical or fuel cells. A membrane may be formed of or include a sulfonated polymer whereby the sulfonated polymer is covalently or ionically associated with a multi-nitrogen containing heterocyclic molecule. The resulting membranes possess excellent ion conductivity and selectivity.

19 Claims, 1 Drawing Sheet

Related U.S. Application Data

(60) Provisional application No. 62/290,692, filed on Feb. 3, 2016.

(51) Int. Cl.
*B01D 69/10* (2006.01)
*B01D 71/82* (2006.01)
*C08J 5/22* (2006.01)
*H01M 8/103* (2016.01)
*H01M 8/1062* (2016.01)
*H01M 8/1081* (2016.01)
*H01M 8/18* (2006.01)

(52) U.S. Cl.
CPC ........... *C08J 2327/12* (2013.01); *Y02E 60/50* (2013.01); *Y02P 70/50* (2015.11)

(56) References Cited

U.S. PATENT DOCUMENTS

| | | | |
|---|---|---|---|
| 2002/0160272 A1* | 10/2002 | Tanaka | C08J 5/2293 429/189 |
| 2008/0020256 A1 | 1/2008 | Manthiram et al. | |
| 2009/0297910 A1 | 12/2009 | Zhu et al. | |
| 2011/0318644 A1 | 12/2011 | Zhai et al. | |
| 2015/0191841 A1 | 7/2015 | Grant et al. | |
| 2015/0228887 A1 | 8/2015 | Park et al. | |

FOREIGN PATENT DOCUMENTS

| | | |
|---|---|---|
| JP | 2008288193 A | 11/2008 |
| JP | 2010232158 A | 10/2010 |
| JP | 2010267408 A | 11/2010 |
| KR | 10-2013-0112976 | 10/2013 |
| WO | 2008/102851 A1 | 8/2008 |
| WO | 2014/084138 A1 | 6/2014 |

OTHER PUBLICATIONS

Liu, Shuai et al., "Novel sulfonated poly (ether ether keton)/ polyetherimide acid-base blend membranes for vanadium redox flow battery applications", 2014, Electrochimica Acta, vol. 130, pp. 90-96.

Bohang Song et al: "Structural evolution and the capacity fade mechanism upon long-term cycling in Li-rich cathode material", Physical Chemistry Chemical Physics, vol. 14, No. 37, Jan. 1, 2012 (Jan. 1, 2012), p. 12875, XP055588314, ISSN: 1463-9076, DOI: 10.1039/c2cp42068f.

Yao X L et al: "Comparisons of graphite and spinel Li"1". "3"3Ti"1 "."6"70"4 as anode materials for rechargeable lithium-ion batteries", Electrochimica A, Elsevier Science Publishers, Barking, GB, vol. 50, No. 20, Jul. 25, 2005 (Jul. 25, 2005), pp. 4076-4081, XP004971778, Issn: 0013-4686, DOI: 10.1016/J.ELECTACTA. 2005.01.034.

European Search Report from Application No. 17750763.9 dated May 22, 2019.

\* cited by examiner

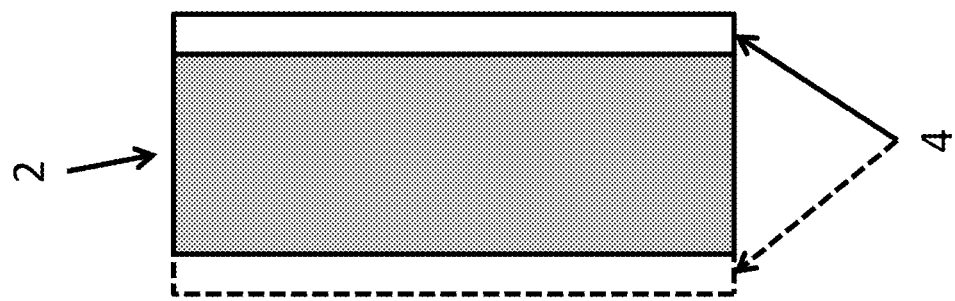

BIPOLAR IONOMER MEMBRANE

CROSS REFERENCE TO RELATED APPLICATIONS

This application is a continuation of U.S. patent application Ser. No. 16/072,995 filed Jul. 26, 2018, which is a U.S. National Stage under 35 U.S.C. § 371 of PCT/US2017/016538 filed Feb. 3, 2017, and which depends from and claims priority to U.S. Provisional Application No. 62/290,692 filed Feb. 3, 2016, the entire contents of each of which are incorporated herein by reference.

STATEMENT OF GOVERNMENT RIGHTS

This invention was created with Government support under Contract No. DE-SC0006457 awarded by the U.S. Department of Energy. The Government has certain rights in this invention.

FIELD

This disclosure relates to ion exchange membranes for use in electrochemical applications such as use as a separator in an electrochemical cell.

BACKGROUND

Vanadium redox flow batteries (VRB) are rugged, multi-KWh long life flow batteries with an energy density of approximately 20 Wh/liter that can economically store large amounts of regenerative energy in liquid form and are useful as energy accumulators in intermittent renewable power plants such as wind and solar, or storage of off-peak power generation. The VRB functions by pumping charged anolyte and catholyte from storage tanks through electrochemical half-cells separated by an ion permeable membrane in contact with a carbon felt anode and cathode on either side of the membrane. The cell discharges by electrons flowing from the anolyte through the power load to the catholyte while charge balance is maintained by ions, usually protons, flowing through the ion permeable membrane.

Negative half-cell $V^{2+} \leftarrow \rightarrow V^{3+} + e^-$  $Eo = -0.255V$

Positive half cell $e^- + VO_2^+ + 2H^+ \leftarrow \rightarrow VO^{2+} + H_2O + V^{3+}$  $Eo = 1.00V$ Overall $VO_2^+ + 2H^+ + V^{2+} \leftarrow \rightarrow VO^{2+} + H_2O + V^{3+}$ Net $Eo = 1.255V$ Vanadium ions constitute both the anolyte ($V^{3+}/V^{2+}$ couple) and catholyte ($VO^{2+}/VO_2^+$ couple), which greatly simplifies and improves the lifetime of the battery because even if the separator leaks, there is no chemical cross contamination since the composition of the leaking species is the same for both anolyte and catholyte; only the charge state varies.

The key enabler to VRB practicality is the ionically conductive separator membrane. Present VRB's, however, have a round trip charge/discharge efficiency of only 75-80% due to detrimental vanadium ion permeation though presently known separators. The ideal membrane would have low vanadium ion permeability, resist vanadium fouling, have high proton conductivity, good oxidative and acidic chemical stability, good mechanical strength and low cost. Sulfonated tetrafluoroethylene based fluoropolymer-copolymer cation-exchange membranes otherwise known as perfluorosulfonic acid (PFSA) membranes or by the trade-name Nafion®, has become the state-of-the-art VRB separator due to its relatively good chemical stability, long service life, good cyclability, high mechanical strength and high proton conductivity.

However, PFSA membranes have many disadvantages including high cost, vanadium fouling and especially vanadium-ion permeation. Vanadium-ion permeation can discharge a charged VRB at idle and also decrease coulombic efficiency during operation, resulting in as much as 6% self-discharge and inefficiency depending on the discharge current. In addition, vanadium-ion carries water of hydration and the vanadium-ion permeation through the membrane can change the water balance of the VRB. Although fouling does not destroy the membrane, it does necessitate periodic removal and washing of the membrane. The relatively high membrane cost also presents a fundamental challenge to overall VRB cost reduction. Thus, for reasons of vanadium ion leakage, membrane fouling and high cost, there is much interest in replacing PFSA membranes with an alternative membrane that addresses these shortcomings.

Bipolar membranes composed of a thin cationic coating on an anionic cation-exchange proton-conductive membrane have demonstrated cation selectivity based on coulombic repulsion of cations with different charges following protonation in acidic media, otherwise known as Donnan exclusion effect. The Donnan effect increases exponentially with permeant cation charge therefore, multivalent cations are repulsed to a greater degree than monovalent protons.

Ogumi demonstrated transport selectivity between divalent $Fe^{2+}$ and monovalent $Li^+$ in acidic medium with a bipolar membrane composed of 4-vinylpyridine plasma polymerized onto cation-exchange PFSA (Nafion®). The 4-vinylpyridine is protonated in acidic media and acquires a positive charge which repulses and inhibits divalent cation permeation more than monovalent cation permeation. Sata reports bipolar membranes consisting of aliphatic amines and polyamines, such as polyethyleneimine, chemically grafted onto PFSA film have demonstrated monovalent cation permselectivity in continuous electrodialytic concentration of sea water.

This principle has been demonstrated in VRB membranes as well. Luo reported a decrease in $VO^{2+}$ transport by a factor of 20 with a membrane composed of polyethyleneimine (PEI) grafted onto Nafion 117 when compared to ungrafted Nafion 117®. The net result was an increase of coulombic efficiency from 93.8 to 97.3% when comparing a 5% grafted PEI-Nafion 117® to an unmodified Nafion 117® membrane. However, the proton conductivity of the PEI grafted membrane also undesirably decreased by approximately 30%.

Primary and secondary amines in a bipolar membrane can have a relatively high basicity, for example a pKa greater than about 9, and when protonated, can have a sufficiently strong Donnan effect to inhibit proton transport to an undesirable degree. Also, primary and secondary aliphatic amines and polyamines may not be stable towards oxidation by $V^{5+}$ ions. It is therefore desirable to provide a bipolar VRB membrane that does not contain primary or secondary amines or polyamines for the reasons described above.

Direct methanol fuel cells use proton conductive membranes such as PFSA and other sulfonated polymers. A problem encountered with these membranes is self-discharge caused by methanol crossover through the membrane which lowers the fuel cell efficiency.

As such new materials are needed that are useful as a separator in vanadium redox flow batteries or other applications requiring desirable ion permeation selectivity and permittivity.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are bipolar membranes with desirable ion permeation selectivity and permittivity that may be used for a VRB with reduced vanadium-ion permeation and while maintaining or improving proton conductivity. The bipolar membrane is optionally non-porous. Optionally, a bipolar membrane as provided herein has a greater oxidation stability than bipolar membranes containing primary or secondary non-cyclic aliphatic amines. Optionally, a non-porous composite membrane is provided with a low cost microporous support membrane wherein the membrane pores are filled with a sulfonated polymer.

Provided are bipolar membranes including a sulfonated polymer, optionally a sulfonated polymer film, and a multi-nitrogen containing heterocyclic molecule comprised of two or more nitrogen atoms and hereafter known as heterocyclic multi-nitrogen containing molecule, chemically bonded to at least one surface of the sulfonated polymer. After bonding to the sulfonated polymer, a secondary or tertiary amine of the heterocyclic multi-nitrogen containing molecule may have a pKa below about 9.0. Prior to chemically bonding to the surface of the sulfonated polymer the heterocyclic nitrogen containing molecule is optionally one molecule derived from the group consisting of adenine, aminoisoquinoline, aminobenzimidazole, 4-aminopiperidine, and aminoimidazopyridine. Optionally, combinations of any of the foregoing may be used.

Also provided are composite bipolar membranes including a microporous support membrane wherein the pores of the microporous membrane are substantially filled with the bipolar composition as provided herein.

Also provided are composite bipolar membranes including a microporous support membrane wherein the pores of the microporous support membrane are smaller than about 10 microns and substantially filled with the bipolar composition as provided herein, optionally wherein the microporous support film is comprised of at least one polymer selected from the group consisting of polyolefin, polytetrafluoroethylene, polysulfone, polyethersulfone, polyester, polyimide, polyamide, nitrocellulose, and mixed cellulose ester.

Also provided are nonporous composite bipolar membranes including a non-woven support membrane wherein the pores of the non-woven support membrane are larger than about 10 microns and substantially filled with the bipolar composition as provided herein and the microporous support film is optionally comprised of at least one polymer selected from the group consisting of polyolefin, polytetrafluoroethylene, polysulfone, polyethersulfone, polyester, polyimide, polyamide, nitrocellulose, and mixed cellulose ester.

Also provided are methods for manufacturing the membrane or the composite membrane as provided herein.

Also provided are vanadium redox flow batteries incorporating the membrane and/or bipolar composition as provided herein.

In addition to incorporation into a VRB, the membrane or composite membrane according as provided herein can also be used in other flow batteries and fuel cells, in particular direct methanol fuel cell.

BRIEF DESCRIPTION OF THE DRAWING

The aspects set forth in the drawing are illustrative and exemplary in nature and not intended to limit the subject matter defined by the claims. The following detailed description of the illustrative aspects can be understood when read in conjunction with the following drawings, where like structure is indicated with like reference numerals and in which:

FIG. 1 is a schematic of a membrane according to some aspects as provided herein.

DETAILED DESCRIPTION

The following description is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

A membrane is provided that includes modifications to the membrane polymeric structure whereby the combination of the membrane material and the modifier dramatically improve the ability of the membrane to be useful in an electrochemical cell or a fuel cell as a separator between half cells. The provided membranes decrease unwanted ion transport across the membrane while increasing or substantially unfaltering the excellent proton transport abilities of the underlying polymeric membrane materials. As such, it is an object of this disclosure to provide a membrane that includes a heterocyclic multi-nitrogen containing molecule covalently bonded to at least one surface or active group of a sulfonic acid containing polymer. A bipolar membrane can be prepared by any chemical process suitable for associating, optionally covalently associating, a heterocyclic multi-nitrogen containing molecule to a sulfonic acid containing polymer. In some aspects, a heterocyclic multi-nitrogen containing molecule includes an amine or amide functional group substituent onto the ring(s) in one or more locations such that a membrane may be formed using an amination process by either sulfonamide coupling or acid-base salt formation via protonation of the unbonded electron pair in the amine As such, in some non-limiting aspects, the amine reagent or precursor optionally contains a primary or secondary amine moiety for the purpose of bonding to the sulfonic acid containing polymer. While the following disclosure is directed to the membranes for use primarily in a vanadium redox battery it is appreciated that such is for illustrative purposes alone and is not limiting. Membranes may be used in other electrochemical cells or fuel cells such as direct methanol fuel cells.

In some aspects, a membrane is useful as a separator in a vanadium redox battery. It has been found that, although vanadium ion permeability can be very low in a surface aminated sulfonic acid polymer, the aforementioned bipolar membrane can have unacceptably low proton permeability if the amine a polymeric primary or secondary amine such as polyethyleneimine or polyamidoamine hyperbranched dendrimer, and also when the amine has a pKa greater than about 9.0 after bonding to the sulfonic acid polymer. Through extensive research, the inventors found that if the amine is a heterocyclic multi-nitrogen containing molecule, optionally a multi-nitrogen containing heterocyclic amine, and/or having a pKa less than about 9.0 after bonding to the sulfonic acid polymer, then both high proton permeability and low vanadium ion permeability can be achieved. While not bound by any particular theory, it is believed that a heterocyclic molecule bound to a sulfonic acid polymer with a pKa less than about 9.0 will have a weaker Donnan repulsion than a modifier molecule with a pKa greater than about 9.0, after protonation in the acidic VRB electrolyte, and thus lower proton permeability is achieved while maintaining low vanadium ion rejection. Further, while not wanting to be bound by any particular theory, by replacing sulfonic acid protons on the membrane surface with one or more heterocyclic molecules with a pKa less than 9.0, it may be possible to enhance Grothaus proton "hopping" transport from one bound heterocyclic site to the next by a hydrogen bonding/breaking mechanism. Since hydrated vanadium ions likely do not participate in Grothaus transport but instead by vehicle transport their permeation would not be enhanced, thus favoring proton transport over vanadium cation transport.

As such, a membrane is provided that includes a base material (e.g. in film or membrane form) whereby the base material may be or may include one or more polysulfonic acid polymers therein whereby one or more surfaces of the base material may be coated on one or both sides with a heterocyclic multi-nitrogen containing molecule as a modifier. A schematic illustration of an exemplary membrane is provided in FIG. 1. As depicted a base material 2 is coated, contacted, or otherwise associated with a modifier 4 so as to form a heterocyclic multi-nitrogen containing that is surface exposed on the base material. The heterocyclic multi-nitrogen containing molecule optionally forms a film layer on the surface, partially or fully penetrates the surface of the base material, or combinations thereof. The heterocyclic multi-nitrogen containing molecule layer is optionally on the base material, optionally directly on the base material. The heterocyclic multi-nitrogen containing molecule layer is optionally substantially continuous over the surface of the base material or is discontinuous. The reaction of the heterocyclic multi-nitrogen containing molecule with a sulfonic acid polymer results in a certain degree of substitution of the heterocyclic amine for sulfonic acid proton. The degree of substitution of heterocyclic molecule for proton can be 0.01% to 100% or any value or range therebetween, optionally 0.1% to 80%, optionally 10% to 80%, optionally 10% to 50%.

A membrane is provided with one or more heterocyclic multi-nitrogen containing molecules associated with a polysulfonic acid either covalently, ionically, or otherwise. A heterocyclic multi-nitrogen containing molecule includes carbon and at least two nitrogen atoms in the ring structure. A heteroatom is optionally any heteroatom so as to provide basicity to the heterocyclic ring. Illustrative examples of a heteroatom include nitrogen and phosphorous. Other suitable heteroatoms may also be included in the ring structure in some aspects. A heterocyclic molecule includes at least one heterocyclic ring structure. Optionally, a modifier is a non-cyclic molecule with at least one substituent of phosphorous, optionally with a pKa after bonding to the polysulfonic acid of 9.0 or less. In some aspects, multiple rings, optionally multiple heterocyclic rings are optionally included in a multi-nitrogen containing heterocyclic molecule, optionally but not required with each ring containing one or more heteroatoms. In some aspects, 1, 2, 3, 4, 5 or more heterocyclic rings or non-heterocyclic rings may be included in a multi-nitrogen containing heterocyclic molecule. Optionally, a multi-nitrogen containing heterocyclic molecule is not a polymer.

A membrane as provided optionally has a multi-nitrogen containing heterocyclic molecule with a pKa at or less than 9.0 after bonding to the sulfonic acid polymer. Optionally, the pKa is at or less than 9.0, 8.5, 8.0, 7.5, 7.0, 6.5, 6.0, 5.5, 5.0, 4.5, 4.0, 3.5, r 3.0. In some aspects, the pKa is from 3.0 to 9.0 or any value or range therebetween, optionally 6.0 to 8.0. In some aspects, a membrane is free of a modifier on a sulfonic acid containing polymer with a pKa of greater than 9.0 after bonding to the polymer.

The resulting membrane is optionally a non-porous membrane. A non-porous membrane is one that has a Gurly Air Permeability number greater than 86,400 sec/10 cc 0.20 in$^2$. In some aspects, a membrane has a Gurly Air Permeability of 3600 sec/10 cc 0.20 in$^2$ or greater, optionally 40,000 sec/10 cc 0.20 in$^2$ or greater.

A membrane as provided has equivalent or reduced proton resistivity with the heterocyclic molecule modifier associate with the polymer relative to a modifier free polymer system. In some aspects, the proton resistivity is at or less than 20 ohm cm$^2$, optionally 1 ohm cm$^2$ or less. In some aspects proton resistivity is from 0.1 to 0.5 ohm cm$^2$, optionally 0.2 to 0.4 ohm cm$^2$.

A membrane as provided optionally has a reduced or substantially equal vanadium ion transport relative to a membrane without modification by a heterocyclic molecule modifier. In some aspects, vanadium ion transport is at or less than $1.1\times10^{-4}$ moles/day cm$^2$ in 1.0M vanadyl sulfate/3M sulfuric acid, optionally $1.0\times10^{-5}$ moles/day cm$^2$ in 1.0M vanadyl sulfate/3M sulfuric acid.

The inventor discovered that amongst the heterocyclic multi-nitrogen containing amines satisfying or producing the aforementioned properties, some have much higher proton/vanadium ion permselectivity than others. In particular, bipolar membranes prepared from direct reaction of the protonated form of perfluorosulfonic acid (PFSA) (e.g. Nafion®) with an aqueous solution of adenine, aminoisoquinoline, aminobenzimidazole, 4-aminopiperidine, or aminoimidazopyridine have demonstrated high vanadium ion rejection and, in the case of adenine and aminoimidazopyridine, desirable proton conductivity as well. Combinations of the aforementioned adenine, aminoisoquinoline, aminobenzimidazole, 4-aminopiperidine, and aminoimidazopyridine can be also be used as the precursor heterocyclic multi-nitrogen containing molecule. In some aspects, a sulfonic acid polymer is modified with only an amine containing material that is exclusively adenine, aminoisoquinoline, 4-aminopiperidine, aminobenzimidazole, aminoimidazopyridine, and combinations thereof. In some aspects, a sulfonic acid polymer is modified with an amine containing molecule that is exclusively adenine, aminoimidazopyridine, or combinations thereof.

Association of the multi-nitrogen containing heterocyclic molecule to the sulfonic acid polymer, optionally to one or more surfaces of a sulfonic acid polymer film, can be achieved by either sulfonamide coupling or acid-base salt formation henceforth known as amination. Such is a non-limiting example of a mechanism of association of a heterocyclic molecule with a sulfonic acid polymer. Illustrative connectivities include those formed by or through a sulfonamide, acid anhydride, ester, or combinations thereof. As such, a multi-nitrogen containing heterocyclic molecule optionally includes one or more substituents that include a functional group suitable for associating with a sulfonic acid polymer. Such substituents illustratively include, but are not limited to an amine, optionally a primary or secondary amine, a hydroxyl, or a carboxylic acid. In some aspects, a sulfonic acid polymer film is first modified at the sulfonate group so as to associate with one or more heterocyclic molecules with differing functional groups. For example, a polymer is optionally modified by converting the sulfonate group to an acyl chloride such as using PCl$_3$ or PCl$_5$ and then reacting with an acid, amine or alcohol moiety containing substituent on the heterocyclic molecule. Other suitable connectivities between the multi-nitrogen containing heterocyclic molecule and the polymer are similarly suitable.

In some aspects, the multi-nitrogen containing heterocyclic molecule may include a substituent that includes a primary or secondary amine with unpaired nitrogen electrons available for either sulfonamide coupling or acid-base salt formation by protonation with sulfonic acid protons. Sulfonamide coupling can be achieved by several methods including direct condensation, acid chloride coupling, or carbodiimide coupling. Direct condensation may be used in some aspects because of its lower cost, avoidance of toxic and corrosive reagents and fewer number of reaction steps. Direct condensation consists of reaction between the proton form of the sulfonic acid polymer and a solution of the heterocyclic amine. The reaction can result in creation of a sulfonamide coupling and elimination of water. The reaction can be illustrated as: $RSO_3H + R'NH_2 \rightarrow RSO_2NHR' + H_2O$ (where R is the sulfonic acid polymer containing moiety and R' is the heterocyclic amine moiety).

Acid-base salt formation can also be achieved by similar conditions as sulfonamide coupling and results in a proton transfer from the acid form of the sulfonic acid polymer to the unpaired electron in the heterocyclic amine. The reaction can be shown as: $RSO_3H + R'NH_2 \rightarrow RSO_3^- \; ^+NH_3R'$ (where R is the sulfonic acid polymer containing moiety and R' is the heterocyclic amine moiety).

In both direct condensation and acid-base salt formation the multi-nitrogen containing heterocyclic molecule with an amine substituent is immobilized on the sulfonated polymer.

Also, in both direct condensation and acid-base salt formation, the bipolar multi-nitrogen containing heterocyclic molecule-sulfonic acid polymer film can be prepared by coating a solution of the multi-nitrogen containing heterocyclic molecule directly onto a sulfonic acid polymer film or by immersing a sulfonic acid polymer film into a bath of the multi-nitrogen containing heterocyclic molecule containing solution. In some aspects, one side of the film can be temporarily occluded or masked in order to limit association with the heterocyclic molecule to one side of the film. After the reaction has proceeded to the desired degree, the excess multi-nitrogen containing heterocyclic molecule can be washed away from the sulfonated film.

The sulfonic acid polymer is optionally in the form of a film or membrane. In such instances, the sulfonic acid polymer film or membrane can optionally be pre-swollen prior to contact with the multi-nitrogen containing heterocyclic molecule, where pre-swelling may be by immersion into pure solvent (i.e., free of multi-nitrogen containing heterocyclic molecule), used to dissolve the multi-nitrogen containing heterocyclic molecule, prior to reaction therewith. This can prevent physical distortion of the sulfonic acid polymer film when it is immersed in the multi-nitrogen containing heterocyclic molecule solution.

The solvent for the heterocyclic molecule for association with the sulfonic acid polymer is optionally an alcohol, ketone, ester, water or mixture thereof. In some aspects a solvent is water, optionally exclusively water.

The sulfonic acid polymer is optionally one or more of the group consisting of per(fluorosulfonic acid/polytetrafluoroethylene) copolymer, sulfonated polystyrene, sulfonated trifluoropolystyrene, sulfonated polystyrene-divinylbenzene copolymer, sulfonated styrene-butadiene, sulfonated polyparaphenylene, sulfonated poly(etheretherketone), sulfonated poly(ether-ketone-ether-ketone-ketone), sulfonated polysulfone, sulfonated poly(ethersulfone), sulfonated 2,6-dimethyl-1,4-phenylene oxide, sulfonated poly(phthalazinone ether ketone), sulfonated polyimides, sulfonated polyphosphazene and sulfonated polybenzimidazole, sulfonated polyphenylsulfone, poly(vinylidene fluoride)-graft-poly(styrene sulfonic acid), poly(arylene thioether ketone), poly(arylene thioether ketone ketone), and sulfonated poly fluorenyl ether ketone. In particular aspects, sulfonic acid polymer may be per(fluorosulfonic acid/polytetrafluoroethylene) copolymer otherwise known by the tradename Nafion® or Flemion®.

In some aspects, the sulfonic acid polymer film or membrane has a thickness of 5 microns to 500 microns, or any value or range therebetween. Optionally, the sulfonic acid polymer film has a thickness of 15 microns to 200 microns.

In some aspects, a sulfonic acid polymer film is laminated to a non-woven, optionally porous membrane, optionally so as to provide additional strength to a sulfonic acid polymer film. Optionally, a sulfonic acid polymer is not in the form of a film, but is instead associated with a non-woven or porous membrane of a differing material. Optionally, a sulfonic acid polymer is associated with a porous membrane whereby some or all of the pores of the membrane are filled with a sulfonic acid polymer so as to result in a membrane that is substantially non-porous as defined herein.

The amination process can proceed to a certain degree below the surface of the sulfonic acid polymer if the polymer is sufficiently swollen in the reaction solvent and given sufficient reaction time and temperature. The degree of sulfonate proton substitution by the multi-nitrogen containing heterocyclic molecule is primarily controlled by the concentration of the multi-nitrogen containing heterocyclic amine in the reaction solvent, the reaction time, the reaction temperature and composition of the reaction solvent. In the process using an immersion method, the concentration of multi-nitrogen containing heterocyclic amine may be less than 10% in solution, optionally less than 1 weight percent. Optionally, the immersion time is from 1 second to 24 hours, optionally 10 minutes to 10 hours. The reaction temperature is optionally greater than 0° C. and less than the solvent boiling point at 1.0 atmosphere, optionally greater than 30° C. and less than 100° C. The multi-nitrogen containing heterocyclic molecule solvent may include or be exclusively water, alcohol, ketones, esters, amides, cyclic amides, or mixtures thereof. Optionally, the multi-nitrogen containing heterocyclic molecule solvent is water, optionally only water.

The multi-nitrogen containing heterocyclic molecule is optionally associated with a membrane on one side or both sides of the membrane. In some aspects, the reaction between the multi-nitrogen containing heterocyclic molecule and the polymer can be provided on only one side of the membrane and can be achieved by masking or occluding one side of the membrane with a material that is impervious to the reaction solution. The material to provide the masking or occluding is optionally a polymer sheet or film optionally selected from the group consisting of polyolefins, butyl rubber, silicone rubber, and ethylene-propylene rubber.

In some aspects, a non-porous composite membrane is provided that includes a nonwoven or microporous support film that can be prepared by impregnating a non-woven or microporous film with a solution of sulfonated polymer, drying the solution, annealing the sulfonated polymer impregnated film at a temperature above the glass transition temperature of the sulfonated polymer, and finally associating the multi-nitrogen containing heterocyclic molecule with the sulfonated polymer on at least one surface of the composite film. As a non-limiting example, a non-porous composite bipolar membrane can be prepared by dip coating or soaking the microporous support film in a PFSA solution, such as D520 available from Dupont™ or Nafion® perfluorinated resin solution available from Sigma-Aldrich, drying the film between 60° C. and 120° C., annealing the film between 80° C. and 250° C. and finally associating the annealed film on one or both sides with one or more multi-nitrogen containing heterocyclic molecules. The annealing temperature is optionally above the glass transition temperature of the sulfonated polymer in order to create a continuous non-porous sulfonated polymer film bridge within the pores of the support film. The microporous support film optionally does not melt or flow at the drying and annealing temperature used to prepare the composite membrane. The microporous support film can include at least one polymer selected from the group consisting of polytetrafluoroethylene, polysulfone, polyethersulfone, polyester, polyimide, polyamide, polyolefins, nitrocellulose, cellulose, mixed cellulose ester and combinations thereof. The mean pore size (cross sectional dimension) of the microporous support film is optionally from 0.01 microns to 1000 microns or any value or range therebetween, optionally 0.05 microns to 20 microns. The thickness of the support film is optionally from 5 to 500 microns, or any value or range therebetween, optionally 15 to 200 microns.

The membrane as provided herein is optionally utilized in an electrochemical cell, a fuel cell, or for any other purpose whereby selective permeability is desired. In some aspects a membrane is incorporated into an electrochemical cell, such as a vanadium redox cell. An electrochemical cell optionally includes a negative half-cell and a positive half-cell. The negative half-cell includes an anode and an anolyte. A positive half-cell optionally includes a cathode and a catholyte. A membrane as provided herein is positioned between the two half cells so as to form a barrier between the anolyte and the catholyte. The selective permeability of the membrane improves the function and efficiency of the cell by maintaining or improving ion conductivity while reducing vanadium (or other reactant) permeation of the membrane from one half cell to the other.

In some aspects, a membrane is associated with a multi-nitrogen containing heterocyclic molecule on only one side of the membrane. Is such circumstances, the multi-nitrogen containing heterocyclic molecule associated side is optionally proximal to the negative half-cell side of the cell so as to improve membrane performance.

In some aspects, an electrochemical cell is a vanadium redox battery or portion thereof. Optionally the anolyte and catholyte include vanadium ions at different oxidation states. In a vanadium oxide battery the linkage between the sulfonic acid polymer and the multi-nitrogen containing heterocycle is optionally an amide or amine-acid salt association, optionally as linked by a sulfonamide group In some aspects, a membrane as provided herein is included in a fuel cell. A fuel cell includes an anode, a cathode, and a membrane as provided herein separating the anode and the cathode. In some aspects, a membrane is associated with a multi-nitrogen containing heterocyclic molecule on only one side of the membrane. Is such circumstances, the multi-nitrogen containing heterocyclic molecule associated side is optionally proximal to the anode side of the cell so as to improve membrane performance.

In some aspects, a fuel cell is a direct methanol fuel cell. In a direct methanol fuel cell the linkage between the sulfonic acid polymer and the multi-nitrogen containing heterocycle is optionally an amide or amine-acid salt association, optionally as linked by a sulfonamide group, optionally linked through an acid anhydride, or ester linkage.

Various aspects of the present invention are illustrated by the following non-limiting examples. The examples are for illustrative purposes and are not a limitation on any practice of the present invention.

EXPERIMENTAL

Proton Resistivity

The proton resistivity is measured in a 4 point probe thru-plane clamped conductivity cell using 2M sulfuric acid electrolyte, 1.3 cm$^2$ electrode area and platinum electrodes. AC impedance is measured with an EGG Princeton Applied Research Potentiostat/Galvanostat Model 273A using a 10 mv signal scanned from 600 KHz to 10 Hz. The bulk resistance is derived from the low impedance intersect of the high frequency semi-circle on the real impedance axis of the complex impedance plane. The bulk resistance is then subtracted from the resistance of the test fixture containing no membrane to obtain the resistance of the membrane. The resistivity is normalized for area and reported as an area resistance in ohm cm$^2$.

Vanadium Ion Transport

The vanadium ion transport is measured in a clamped diffusion cell with 1.0M Vanadyl Sulfate (VO$^{2+}$ ions) in 3M sulfuric acid on one side of the test membrane and 1.0M Mg$_2$SO$_4$ in 3M sulfuric acid on the other side to balance osmotic pressure. After a period of time the concentration of vanadium in the Mg$_2$SO$_4$ chamber is measured spectroscopically. The vanadium ion leakage is reported as moles Vanadium/cm$^2$ day.

Ion Exchange Capacity

The ion exchange capacity (IEC) of the bipolar membrane is determined by acid-base titration. IEC provides useful information regarding the number of accessible proton exchange sites in the film. The dry bipolar membrane is immersed in a saturated NaCl solution for 2 hrs/60° C. then 24 hrs/30° C. to ion exchange Na$^+$ for H$^+$ and the released H$^+$ is acid-base titrated to determine mequiv. g$^{-1}$ of protons. The IEC is calculated by: IEC=(H$^+$ mequiv.)/dry wt membrane=meq/gram.

Porosity

Membrane porosity is determined by Gurley Air Permeability apparatus. A membrane with a Gurley number of greater than 86,400 sec/10 cc 0.20 in$^2$ is considered non-porous.

Example 1

A 0.470 g perfluorosulfonic acid (PFSA) (Nafion® 117) film is occluded on one side with butyl rubber by mechanically affixing a butyl rubber membrane to one side of the film to allow amination on only one side of the film. The occluded film is soaked in 50 grams distilled water for 30 minutes at 80° C. in order to pre-swell the film. The water swollen film is then soaked in 50 grams of a 0.05% 5-Aminoisoquinoline aqueous solution (Alfa Aesar L01223) at 80° C. for 3 hours then rinsed off with distilled water. The film has a proton area resistivity of 0.30 ohm cm$^2$ in 2M sulfuric acid, and ion exchange capacity of 0.821 meq/gram and a vanadyl ion transport of 2.75×10$^{-5}$ moles/day cm$^2$ in 1.0M vanadyl sulfate/3M sulfuric acid. The vanadyl ion transport is 4 times slower versus unmodified PFSA and the proton conductivity is comparable.

Example 2

A 0.470 g perfluorosulfonic acid (PFSA) (Nafion® 117) film is occluded on one side with butyl rubber by mechanically affixing a butyl rubber membrane to one side of the film to allow amination on only one side of the film. The occluded film is soaked in 50 grams distilled water for 30 minutes at 80° C. in order to pre-swell the film. The water swollen film is then soaked in 50 grams of a 0.125% 5-Aminoisoquinoline aqueous solution (Alfa Aesar L01223) at 80° C. for 3 hours then rinsed off with distilled water. The film has a proton area resistivity of 1.0 ohm cm$^2$ in 2M sulfuric acid, and ion exchange capacity of 0.749 meq/gram and a vanadyl ion transport of 9.2×10$^{-6}$ moles/day cm$^2$ in 1.0M vanadyl sulfate/3M sulfuric acid. The vanadyl ion transport is 12 times slower versus unmodified PFSA.

Example 3

A 0.470 g perfluorosulfonic acid (PFSA) (Nafion® 117) film is occluded on one side with butyl rubber by mechanically affixing a butyl rubber membrane to one side of the film to allow amination on only one side of the film. The occluded film is soaked in 50 grams distilled water for 30 minutes at 80° C. in order to pre-swell the film. The water swollen film is then soaked in 50 grams of a 0.25% 5-Aminoisoquinoline aqueous solution (Alfa Aesar L01223) at 80° C. for 3 hours then rinsed off with distilled water. The film has a proton area resistivity of 1.3 ohm cm$^2$ in 2M sulfuric acid, and ion exchange capacity of 0.67 meq/gram and a vanadyl ion transport of 5.7×10$^{-6}$ moles/day cm2 in 1.0M vanadyl sulfate/3M sulfuric acid. The vanadyl ion transport is 19 times slower versus unmodified PFSA.

Example 4

A 0.470 g perfluorosulfonic acid (PFSA) (Nafion® 117) film is occluded with butyl rubber to allow amination of only one side of the film. The occluded film is soaked in 50 grams distilled water for 30 minutes at 80° C. in order to pre-swell the film. The water swollen film is then soaked in a 50 grams of a 0.25% adenine aqueous solution (Aldrich A8626) at 80° C. for 2 hrs then rinsed off with distilled water. The film has a proton area resistivity of 0.34 ohm cm$^2$ in 2M sulfuric acid, and ion exchange capacity of 0.869 meq/gram and a vanadyl ion transport of 1.7×10$^{-5}$ moles/day cm2 in 1.0M vanadyl sulfate/3M sulfuric acid. The vanadyl ion transport is 6 times slower versus unmodified PFSA and the proton conductivity is comparable.

Example 5

A 0.470 g perfluorosulfonic acid (PFSA) (Nafion® 117) film is occluded with butyl rubber to allow amination of only one side of the film. The occluded film is soaked in 50 grams distilled water for 30 minutes at 80° C. in order to pre-swell the film. The water swollen film is then soaked in 50 grams of a 0.25% 3-Aminoimidazo(1,2)pyridine aqueous solution (Sigma Aldrich 685755) at 80° C. for 3 hrs then rinsed off with distilled water. The film has a proton area resistivity of 0.30 ohm cm$^2$ in 2M sulfuric acid, and ion exchange capacity of 0.702 meq/gram and a vanadyl ion transport of 5.9×10$^{-6}$ moles/day cm2 in 1.0M vanadyl sulfate/3M sulfuric acid. The vanadyl ion transport is 19 times slower versus unmodified PFSA and the proton conductivity is comparable.

Example 6

A 0.470 g perfluorosulfonic acid (PFSA) (Nafion® 117) film is occluded with butyl rubber to allow amination of only one side of the film. The occluded film is soaked in 50 grams distilled water for 30 minutes at 80° C. in order to pre-swell the film. The water swollen film is then soaked in 50 grams of a 0.25% 2-Aminobenzimidazole aqueous solution (Alfa-Aesar L02066) at 80° C. for 3 hrs then rinsed off with distilled water. The film has a proton area resistivity of 14.3 ohm $cm^2$ in 2M sulfuric acid, and ion exchange capacity of 0.504 meq/gram and a vanadyl ion transport of $3.6 \times 10^{-7}$ moles/day cm2 in 1.0M vanadyl sulfate/3M sulfuric acid. The vanadyl ion transport is 312 times slower versus unmodified PFSA.

Example 7

A 0.470 g perfluorosulfonic acid (PFSA) (Nafion® 117) film is occluded with butyl rubber to allow amination of only one side of the film. The occluded film is soaked in 50 grams distilled water for 30 minutes at 80° C. in order to pre-swell the film. The water swollen film is then soaked in 50 grams of a 0.25% 4-aminopiperidine aqueous solution (Alfa-Aesar L20127) at 80° C. for 3 hrs then rinsed off with distilled water. The film has a proton area resistivity of 0.21 ohm $cm^2$ in 2M sulfuric acid, and ion exchange capacity of 0.0 meq/gram and a vanadyl ion transport of $2.3 \times 10^{-5}$ moles/day $cm^2$ in 1.0M vanadyl sulfate/3M sulfuric acid. The vanadyl ion transport is 8 times slower versus unmodified PFSA.

Example 8—Composite Bipolar Membrane

A 15/16 inch diameter polyester membrane disk (Sterlitech Corp., PET0247100) with a thickness of 15 microns, pore size of 0.2 microns, a Gurly Air Permeability of 2.2 sec/100 cc 0.20 $in^2$ and dry weight of 9 mg, is soaked in 0.4 grams of 15% perfluorosulfonic acid polymer solution (Ion Power Inc. EW1100) for 10 minutes at room temperature in a glass beaker. After soaking the excess solution is poured out and the wet membrane is dried at 80° C. for 20 minutes. After drying, 1.0 gram of water is added to release the membrane from the glass surface, and then the membrane is re-dried at 80° C. for 10 minutes. The dried membrane is annealed at 130° C. and 1 kilogram/$in^t$ pressure between Polytetrafluoroethylene (PTFE) (Teflon®) sheets for 20 minutes. The membrane is soaked in 50 grams of a 0.10% 3-Aminoimidazo(1,2)pyridine aqueous solution at 80° C. for 3 hours then washed in distilled water. One side of the film is occluded with butyl rubber to allow amination of only one side of the film. The membrane has a weight of 26 mg, a thickness of 19 microns, a Gurly Air Permeability of >86,400 sec/10 cc 0.20 $in^2$ and a proton area resistivity of 0.83 ohm $cm^2$ in 2M sulfuric acid, and a vanadyl ion transport of $3.95 \times 10^{-7}$ moles/day $cm^2$ in 1.0M vanadyl sulfate/3M sulfuric acid. The vanadyl ion transport is 278 times slower versus unmodified PFSA.

Comparative Example 1

A 0.470 g perfluorosulfonic acid (PFSA) (Nafion® 117) film is occluded on one side with butyl rubber by mechanically affixing a butyl rubber membrane to one side of the film to allow amination on only one side of the film. The occluded film is soaked in 50 grams distilled water at 80° C. for 2 hrs. The film has a proton area resistivity of 0.29 ohm $cm^2$ in 2M sulfuric acid, an ion exchange capacity of 0.849 meq/gram and a vanadium transport of $1.1 \times 10^{-4}$ moles/day cm2 in 1.0M vanadyl sulfate/3M sulfuric acid.

Comparative Example 2

A 0.470 g perfluorosulfonic acid (PFSA) (Nafion® 117) film is occluded on one side with butyl rubber by mechanically affixing a butyl rubber membrane to one side of the film to allow amination on only one side of the film. The film is soaked in 50 grams distilled water for 30 minutes at 80° C. in order to pre-swell the film. The water swollen film is then soaked in a 50 grams of a 0.25% 1200MW polyethyleneimine aqueous solution (Polysciences Inc 24313) at 80° C. for 3 hrs then rinsed off with distilled water. The film has a proton area resistivity of 20 ohm $cm^2$ in 2M sulfuric acid, and ion exchange capacity of 0.378 meq/gram and a vanadyl ion transport of $1.3 \times 10^{-6}$ moles/day $cm^2$ in 1.0M vanadyl sulfate/3M sulfuric acid. The vanadyl ion transport is 87 times slower versus unmodified PFSA.

Comparative Example 3

A 0.470 g perfluorosulfonic acid (PFSA) (Nafion® 117) film is occluded on one side with butyl rubber by mechanically affixing a butyl rubber membrane to one side of the film to allow amination on only one side of the film. The occluded film is soaked in 50 grams distilled water for 30 minutes at 80° C. in order to pre-swell the film. The water swollen film is then soaked in a 50 grams of a 0.25% polyamidoamine hyperbranched dendrimer polyelectrolyte dendrimer, ethylenediamine core, generation 4.0 aqueous solution (Aldrich 412449) at 80° C. for 2 hrs then rinsed off with distilled water. The film has a proton area resistivity of 3.1 ohm $cm^2$ in 2M sulfuric acid, and ion exchange capacity of 0.789 meq/gram and a vanadyl ion transport of $1.0 \times 10^{-5}$ moles/day $cm^2$ in 1.0M vanadyl sulfate/3M sulfuric acid. The vanadyl ion transport is 11 times slower versus unmodified PFSA.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

LISTING OF VARIOUS ASPECTS

1. A membrane comprising:
   a sulfonated polymer; and
   a heterocyclic molecule, optionally a multi-nitrogen containing heterocyclic molecule, the heterocyclic molecule covalently bonded to the sulfonated polymer.
2. The membrane of aspect 1 wherein the heterocyclic molecule has a pKa of less than 9.0, optionally between 3.0 and 9.0.
3. The membrane of aspect 1, wherein the Gurly Air Permeability number of the membrane is greater than 86,400 sec/10 cc 0.20 $in^2$.
4. The membrane of aspect 1 wherein the proton resistivity is at or below 20 ohm $cm^2$.
5. The membrane of aspect 1 wherein the vanadium transport is at or below $1.1 \times 10^{-4}$ moles/day $cm^2$ in 1.0M vanadyl sulfate/3M sulfuric acid.
6. The membrane of aspect 1 wherein the thickness of the membrane is between 10 and 1000 microns.
7. The membrane of aspects 1-6 in any combination wherein the heterocyclic molecule is selected from the group consisting of adenine, aminoisoquinoline, aminobenzimidazole, aminoimidazopyridine, 4-aminopiperidine, and combinations thereof.

8. The membrane of aspects in any combination 1-6 wherein, the sulfonated polymer comprises at least one polymer selected from the group consisting of per (fluorosulfonic acid/polytetrafluoroethylene) copolymer, sulfonated polystyrene, sulfonated trifluoropolystyrene, sulfonated polystyrene-divinylbenzene copolymer, sulfonated styrene-butadiene, sulfonated polyparaphenylene, sulfonated poly(etheretherketone), sulfonated poly(ether-ketone-ether-ketone-ketone), sulfonated polysulfone, sulfonated poly(ethersulfone), sulfonated 2, 6-dimethyl-1, 4-phenylene oxide, sulfonated poly(phthalazinone ether ketone), sulfonated polyimides, sulfonated polyphosphazene, sulfonated polybenzimidazole, sulfonated polyphenylsulfone, poly(vinylidene fluoride)-graft-poly(styrene sulfonic acid), poly(arylene thioether ketone) poly(arylene thioether ketone ketone) and sulfonated poly fluorenyl ether ketone, and combinations thereof.

9. The membrane of aspects 1-6 in any combination wherein the polymer is in the form of a non-porous film.

10. The membrane of aspects 1-6 in any combination wherein the sulfonated polymer is associated with a nonwoven or microporous support film.

11. The membrane of aspect 10 wherein the sulfonated polymer is housed within a plurality of pores within the nonwoven or microporous support film.

12. The membrane of aspect 10 wherein the support film comprises polytetrafluoroethylene, polysulfone, polyethersulfone, polyester, polyimide, polyamide, polyolefin, nitrocellulose, cellulose, mixed cellulose ester, or combinations thereof.

13. The membrane of aspect 11 wherein the support film has a pore cross sectional dimension of 0.01 to 1000 microns.

14. Aspects 1, 7, and 8 in combination.

15. Aspects 2, 7, and 8 in combination.

16. Aspects 1, 7, 8, and 9 in combination.

17. Aspects 2, 7, 8, and 9 in combination.

18. Aspects 1, 7, 8, and 10 in combination.

19. Aspects 2, 7, 8, and 10 in combination.

20. A membrane comprising: a sulfonated polymer comprising perfluorosulfonic acid; and a heterocyclic molecule selected from the group consisting of adenine, aminoisoquinoline, aminobenzimidazole, aminoimidazopyridine, 4-aminopiperidine, and combinations thereof, the heterocyclic molecule covalently or ionically bonded to the sulfonated polymer.

21. Aspect 20 wherein the membrane has a Gurly Air Permeability number greater than 86,400 sec/10 cc 0.20 in$^2$.

22. Aspect 20 wherein the proton resistivity is at or below 20 ohm cm$^2$.

23. Aspect 20 wherein the vanadium transport is at or below $1.1 \times 10^{-4}$ moles/day cm$^2$ in 1.0M vanadyl sulfate/3M sulfuric acid.

24. Aspect 20, 21, 22, 23, alone or in combination wherein the thickness of the membrane is between 10 and 1000 microns.

25. A membrane comprising: a sulfonated polymer comprising perfluorosulfonic acid; and a heterocyclic molecule selected from the group consisting of adenine, aminoimidazopyridine, and combinations thereof, the heterocyclic molecule covalently or ionically bonded to the sulfonated polymer.

26. A membrane consisting of: a sulfonated polymer comprising perfluorosulfonic acid; and a heterocyclic molecule selected from the group consisting of adenine, aminoimidazopyridine, and combinations thereof, the heterocyclic molecule covalently or ionically bonded to the sulfonated polymer 27. Aspect 1-26 in any combination wherein the membrane is in an electrochemical cell or a fuel cell.

28. Aspect 1-26 in any combination wherein the membrane is in a vanadium redux battery.

29. Aspect 1-26 in any combination wherein the membrane is in a direct methanol fuel cell.

REFERENCES

1. M. Gattrell, J. Park, B. MacDougall, J. Apte, S. McCarthy, and C. W. Wu, "A study of the mechanism of the vanadium 4+/5+ redox reaction in acidic solutions," Journal of the Electrochemical Society (J. Electrochem. Soc.), 2004, vol. 151, no1, pp. A123-A130
2. S. Eckroad Vanadium Redox Flow Batteries An In-Depth Analysis 1014836 Technical Update, March 2007, Electric Power Research Institute
3. Zempachi Ogumi, Yoshiharu Uchimoto, Masanori Tsujikawa, Kazuaki Yasuda and Zen-Ichiro Takehara, Modification of ion exchange Membrane by Plasma Process. Journal of Membrane Science 54, (1990), 163-74
4. Qingtao Luo, Huaming Zhang, Jian Chen, Peng Qian and Yunfeng Zhai Modification of Nafion® membrane using interfacial polymerization for vanadium redox flow battery applications. Journal of Membrane Science 311 (2008) 98-103
5. Tongwen Xu, Ion exchange membranes: State of their development and perspective. Journal of Membrane Science 263 (2005) 1-29
6. Toshikatsu Sata, Ryuji Izuo. Modification of transport properties of ion exchange membrane. XI. Electrodialytic properties of cation exchange membranes having polyethyleneimine layer fixed by acid-amide bonding. Journal of Applied Polymer Science Volume 41 Issues 9-10 (1990) 2349-2362
7. Morihiro Saito, Naoko Arimura, Kikuko Hayamizu, Tatsuhiro Okada, Mechanisms of Ion and Water Transport in Perfluorosulfonated Ionomer Membranes for Fuel Cells. J. Phys Chem B 2004, 108, 16064-70
8. U.S. Pat. No. 4,849,311 Itoh, et al. Jul. 18, 1989
9. U.S. Pat. No. 5,547,551 Aug. 20, 1996

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:
1. A membrane comprising:
a sulfonated polymer; and
multi-nitrogen containing heterocyclic molecule, the heterocyclic molecule comprising a primary amine substituent;

wherein the primary amine is covalently or ionically bonded to a single sulfonic acid of the sulfonated polymer.

2. The membrane of claim 1, wherein a secondary or tertiary amine in the heterocyclic molecule has a pKa of less than 9.0.

3. The membrane of claim 1, wherein the Gurley Air Permeability number of the membrane is greater than 86,400 sec/10 cc 0.20 in$^2$.

4. The membrane of claim 1, wherein a proton resistivity of the membrane is at or below 20 ohm cm$^2$.

5. The membrane of claim 1, wherein a vanadium transport of the membrane is at or below $1.1 \times 10^{-4}$ moles/day cm$^2$ in 1.0M vanadyl sulfate/3M sulfuric acid.

6. The membrane of claim 1, wherein the sulfonated polymer is housed within a plurality of pores within a nonwoven or microporous support film.

7. The membrane of claim 6, wherein the nonwoven or microporous support film has a pore cross sectional dimension of 0.01 to 1000 microns.

8. The membrane of claim 1, wherein said heterocyclic molecule comprises at least one pendant nitrogen.

9. The membrane of claim 1, wherein said heterocyclic molecule comprises a six membered ring.

10. The membrane of claim 1, wherein the heterocyclic molecule is selected from the group consisting of adenine, aminoisoquinoline, aminobenzimidazole, aminoimidazopyridine, 4-aminopiperidine, and combinations thereof.

11. The membrane of claim 1, wherein the sulfonated polymer comprises at least one polymer selected from the group consisting of per(fluorosulfonic acid/polytetrafluoroethylene) copolymer, sulfonated polystyrene, sulfonated trifluoropolystyrene, sulfonated polystyrene-divinylbenzene copolymer, sulfonated styrene-butadiene, sulfonated polyparaphenylene, sulfonated poly(etheretherketone), sulfonated poly(ether-ketone-ether-ketone-ketone), sulfonated polysulfone, sulfonated poly(ethersulfone), sulfonated 2, 6-dimethyl-1, 4-phenylene oxide, sulfonated poly(phthalazinone ether ketone), sulfonated polyimides, sulfonated polyphosphazene, sulfonated polybenzimidazole, sulfonated polyphenylsulfone, poly(vinylidene fluoride)-graft-poly(styrene sulfonic acid), poly(arylene thioether ketone), poly(arylene thioether ketone ketone), sulfonated poly fluorenyl ether ketone, and combinations thereof.

12. The membrane of claim 1, wherein the sulfonated polymer is in the form of a non-porous film.

13. The membrane of claim 1, wherein the nonwoven or microporous support film comprises polytetrafluoroethylene, polysulfone, polyethersulfone, polyester, polyimide, polyamide, polyolefin, nitrocellulose, cellulose, mixed cellulose ester, or combinations thereof.

14. An electrochemical device comprising:
an anode;
a cathode; and
the membrane of claim 1 positioned between the anode and the cathode.

15. The electrochemical device of claim 14, wherein the membrane comprises the heterocyclic molecule on only one side.

16. The electrochemical device of claim 14, wherein the heterocyclic molecule is on the side proximal to the anode.

17. The electrochemical device of claim 14 in the form of a direct methanol fuel cell, or a battery.

18. The electrochemical device of claim 14, wherein the heterocyclic molecule is covalently connected to the sulfonated polymer via a sulfonamide, acid anhydride, or ester.

19. The electrochemical device of claim 14 in the form of a battery, the battery further comprising an anolyte and a catholyte, the anolyte and the catholyte comprising vanadium.

* * * * *